(12) United States Patent
Eckstein

(10) Patent No.: US 9,975,810 B2
(45) Date of Patent: May 22, 2018

(54) COMPOSITION FOR PRODUCING A REFRACTORY CERAMIC PRODUCT AND METHOD

(71) Applicant: REFRACTORY INTELLECTUAL PROPERTY GMBH & CO. KG, Vienna (AT)

(72) Inventor: Wilfried Eckstein, Trofaiach (AT)

(*) Notice: Subject to any disclaimer, the term of this patent is extended or adjusted under 35 U.S.C. 154(b) by 0 days. days.

(21) Appl. No.: 14/889,910

(22) PCT Filed: Mar. 24, 2014

(86) PCT No.: PCT/EP2014/055810
§ 371 (c)(1),
(2) Date: Nov. 9, 2015

(87) PCT Pub. No.: WO2014/198433
PCT Pub. Date: Dec. 18, 2014

(65) Prior Publication Data
US 2016/0115080 A1    Apr. 28, 2016

(30) Foreign Application Priority Data
Jun. 10, 2013    (EP) .................................. 13171234

(51) Int. Cl.
*C04B 35/04*    (2006.01)
*C04B 35/043*    (2006.01)
(Continued)

(52) U.S. Cl.
CPC ............ *C04B 35/04* (2013.01); *C04B 35/043* (2013.01); *C04B 35/0435* (2013.01); *C04B 35/626* (2013.01); *C04B 38/0067* (2013.01); *C04B 2235/3201* (2013.01); *C04B 2235/3206* (2013.01); *C04B 2235/3208* (2013.01); *C04B 2235/3217* (2013.01); *C04B 2235/3272* (2013.01); *C04B 2235/349* (2013.01); *C04B 2235/3436* (2013.01); *C04B 2235/3445* (2013.01); *C04B 2235/442* (2013.01);
(Continued)

(58) Field of Classification Search
CPC .... C04B 35/04; C04B 35/043; C04B 35/0435
See application file for complete search history.

(56) References Cited

U.S. PATENT DOCUMENTS 3,008,842 A    11/1961    Miller, Jr.
3,615,776 A  * 10/1971    Farrington .............. C04B 35/01
                                                                501/110
(Continued)

FOREIGN PATENT DOCUMENTS

CA    2137983 C      12/1997
CN    1108723    *  9/1995
(Continued)

OTHER PUBLICATIONS

International Search Report for App. No. PCT/EP2014/055810 dated May 16, 2014.

*Primary Examiner* — Karl E Group
(74) *Attorney, Agent, or Firm* — Walker & Jocke Co., LPA

(57) ABSTRACT

The invention relates to a batch for producing an unshaped refractory ceramic product, to a method for producing a fired refractory ceramic product, to a fired refractory ceramic product and to the use of an unshaped refractory ceramic product.

7 Claims, 2 Drawing Sheets

(51) Int. Cl.
 *C04B 38/00* (2006.01)
 *C04B 35/626* (2006.01)

(52) U.S. Cl.
 CPC .................. *C04B 2235/447* (2013.01); *C04B 2235/5212* (2013.01); *C04B 2235/77* (2013.01); *C04B 2235/96* (2013.01)

(56) References Cited

U.S. PATENT DOCUMENTS

| | | | | |
|---|---|---|---|---|
| 4,231,800 A | * | 11/1980 | Holt | B22D 41/08 |
| | | | | 106/636 |
| 4,696,455 A | * | 9/1987 | Johnson | B22D 41/02 |
| | | | | 266/280 |
| 5,036,029 A | | 7/1991 | Johnson | |
| 5,302,563 A | * | 4/1994 | Rumpeltin | B22D 41/02 |
| | | | | 106/690 |

FOREIGN PATENT DOCUMENTS

| | | | |
|---|---|---|---|
| CN | 101481250 A | | 7/2009 |
| EP | 81794 | * | 6/1983 |
| EP | 1564195 B1 | | 8/2005 |
| JP | 03205346 | * | 9/1991 |
| JP | 2010084209 | * | 4/2010 |
| JP | 2010084210 | * | 4/2010 |

* cited by examiner

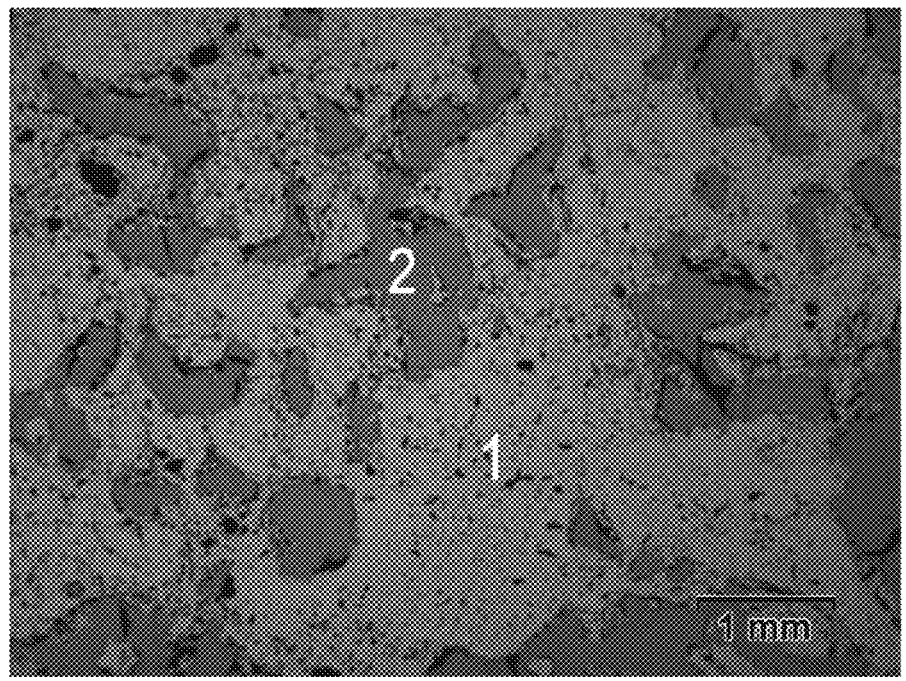
Fig. 1 – Prior Art
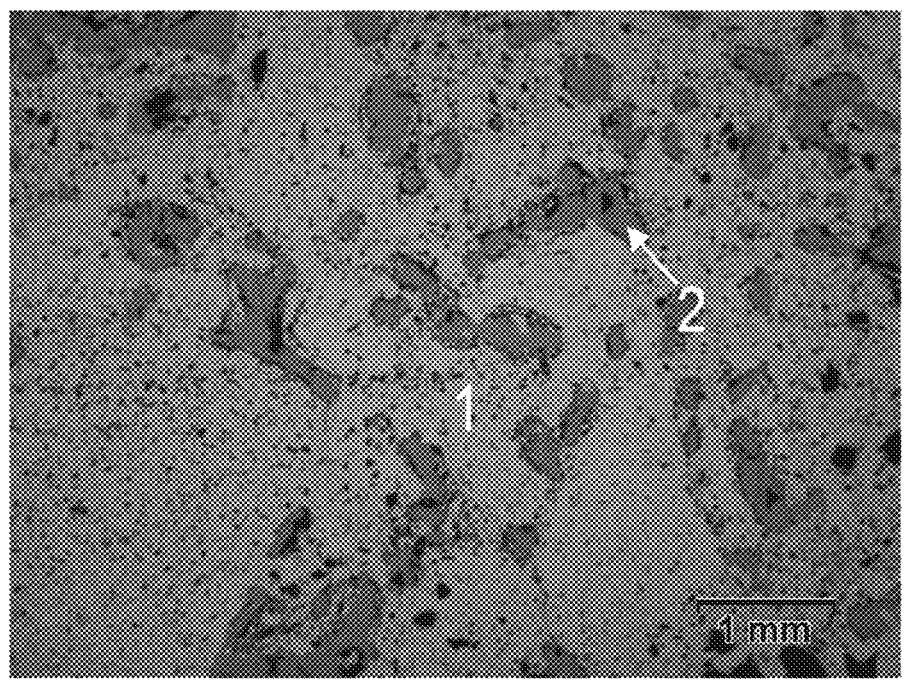
Fig. 2

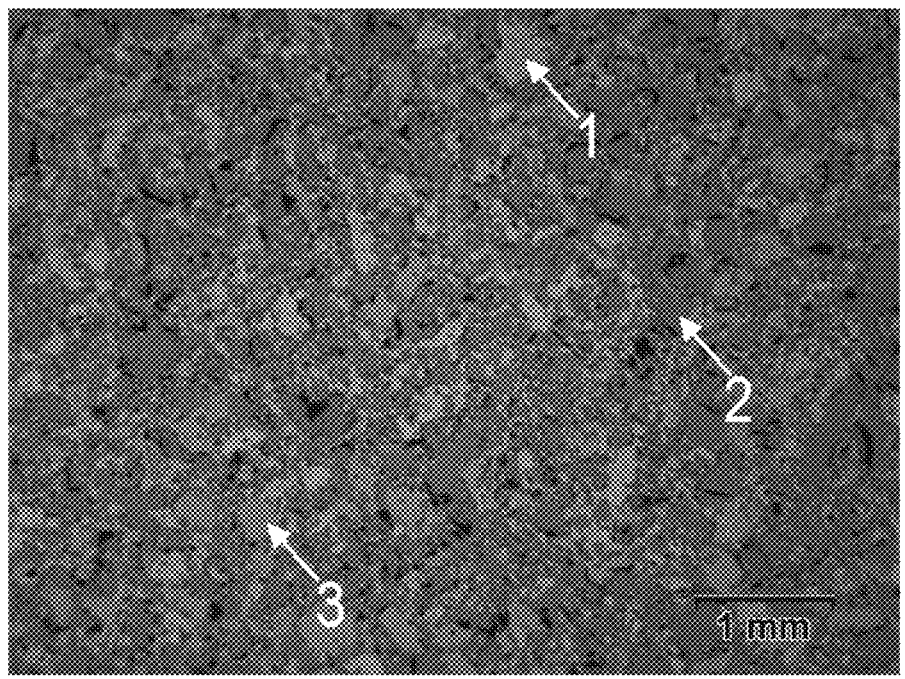
Fig. 3 – Prior Art
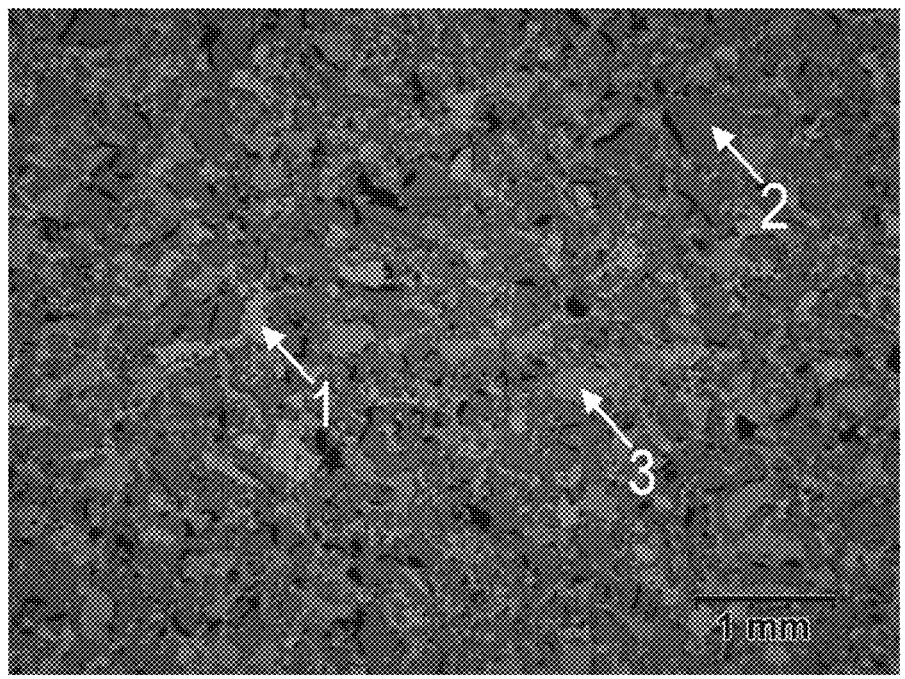
Fig. 4

COMPOSITION FOR PRODUCING A REFRACTORY CERAMIC PRODUCT AND METHOD

The invention relates to a batch for producing an unshaped refractory ceramic product, to a method for producing a fired refractory ceramic product, to a fired refractory ceramic product and to the use of an unshaped refractory ceramic product.

As is known, the term "batch" describes a composition formed from one or more components which can be used to produce a fired refractory ceramic product by means of ceramic firing. The term "refractory ceramic product" as used in the context of the invention in particular describes ceramic products with a service temperature of more than 600° C., and preferably refractory materials as defined in DIN 51060, i.e. materials with a pyrometric cone equivalent >SK17. The pyrometric cone equivalent can in particular be determined in accordance with DIN EN 993-12.

In particular, refractory ceramic products are also known in the form of unshaped refractory ceramic products, i.e. so-called "refractory masses".

In particular, unshaped refractory ceramic products, or respectively refractory masses, are also used as repair and maintenance masses. One of these applications is the use of a refractory mass as a gunning mass which is used to repair highly stressed regions of the furnace. A further application of a refractory mass is its use as a tundish mass. Tundish masses are used to line the tundish. (i.e. pony ladle or cast steel distributor) when casting steel.

Other applications of refractory masses lie in their use as ramming or backfiii masses.

The requirements placed, for example, on gunning or tundish masses as regards their refractory properties are high. Thus, products produced from gunning masses must form a dense matrix against erosion and corrosion. The porosity of linings produced from tundish masses must be high in order to obtain good insulation in this manner and thus to reduce heat losses in the tundish. Simultaneously, however, injection and tundish masses should also form a highly refractory binder matrix which, as a rule, can only be obtained by means of a composition for the batch which can readily be sintered. To this end, large quantities of binding agents or other low-melting point components are required in the batch. These components sink at the prevailing service temperatures of the masses, which temperatures are regularly in the range from approximately 1400° C. to 1700° C., and so does the refractoriness.

The object of the invention is to provide a batch for producing an unshaped refractory ceramic product by means of which a fired refractory ceramic product can be produced, wherein the batch is in particular to be used as a gunning, tundish, ramming or backfill mass. Furthermore, fired refractory ceramic products which can be produced from the batch should have good wear properties, in particular as regards erosion and corrosion, as well as good refractoriness. When the batch is to be used as a tundish mass, a product produced therefrom should also have high porosity.

A further object of the invention is to provide a method for producing a fired refractory ceramic product of this type.

A further object of the invention is to provide a fired refractory ceramic product with the properties mentioned above.

The object of the invention is accomplished by the provision of a batch for producing an unshaped refractory ceramic product, comprising:

55% to 95% by weight of at least one magnesia-based raw material, and
5% to 45% by weight of at least one magnesite-based raw material,
respectively relative to the total weight of the batch; wherein the total calcium carbonate content of the magnesite-based raw materials is less than 10% by weight; relative to the total weight of the magnesite-based raw materials.

Surprisingly, in the context of the invention, it has been shown that a gunning, tundish, ramming or backfill mass can be produced from a batch based on magnesia, wherein at the same time, a fired refractory ceramic product which can be produced from the batch exhibits excellent wear properties with simultaneous excellent refractoriness when the batch comprises one or more magnesite-based raw materials in the form of raw magnesite which has a particularly low total calcium carbonate content.

It is assumed that the principle of these advantageous properties of a gunning, tundish, ramming or backfill mass produced from such a batch is as follows: the magnesite-based raw materials of the batch of the invention consist primarily of magnesium carbonate ($MgCO_3$). Beyond a service temperature of approximately 600° C. when using the batch of the invention, the magnesium carbonate of the raw magnesite material dissociates into MgO and $CO_2$. The caustic MgO which results thereby is characterized by an extremely high reactivity. Because of this high reactivity of the resulting caustic MgO, a direct MgO—MgO bond is formed in the structure of the refractory ceramic product produced from the batch, which results in a high refractoriness of the product. At firing temperatures which are below approximately 1500° C. and which are, for example, typical of service temperatures and the subsequent firing of tundish masses, a high porosity results from the decomposition of the raw magnesite materials into MgO and $CO_2$ which, during service of the fired product produced from the mass, results in superb insulation. At the same time, fusion of the resulting caustic MgO leads to substantial fusion of the product and consequently to a dense matrix which ensures that the fired product is resistant to attack from slag and to infiltration. The fired product thus has a good resistance to erosion and corrosion. In particular, a fired product produced from the batch in accordance with the invention has very good resistance to acidic and high-alumina slags.

Of crucial importance to the invention is the fact that the total calcium carbonate content of the magnesite-based raw materials should be particularly low, less than 10% by weight in accordance with the invention, relative to the total weight of the magnesite-based raw materials. This is because in accordance with the invention, it has been shown that higher calcium carbonate ($CaCO_3$) contents in the magnesite-based raw materials can deteriorate the erosion and corrosion properties of a product based on a batch of this type, along with its refractoriness.

Thus, in accordance with the invention, the total calcium carbonate content of the magnesite-based raw materials may be less than 10% by weight, including, for example, less than 9% by weight, 8% by weight, 7% by weight, 6% by weight, 5% by weight, 4% by weight, 3% by weight, 2% by weight, 2.5% by weight, 2.2% by weight, 2.0% by weight, 1.8% by weight, 1.6% by weight, 1.4% by weight, 1.2% by weight, 1.0% by weight or 0.8% by weight, respectively relative to the total weight of the magnesite-based raw materials in the batch of the invention. These calcium carbonate contents in the magnesite-based raw materials are relative to the total calcium carbonate content in these raw materials. Thus, if the batch of the invention comprises various magnesite-based raw materials, for example, then, for example, the magnesite-based raw materials may comprise different calcium carbonate contents; some of these raw materials may, for example, contain more than 10% by weight relative to this raw material, as long as only the total calcium carbonate content of the magnesite-based raw materials is less than the proportions mentioned above.

BRIEF DESCRIPTION OF DRAWINGS

FIG. 1 shows a gunning mass fired at 1600° C., wherein the basic batch for the gunning mass was compounded without magnesite based raw material.

FIG. 2 shows a gunning mass fired at 1600° C. wherein the basic batch for the gunning mass was mixed in accordance with the teachings herein and included 20% by weight of raw magnesite.

FIG. 3 shows a tundish mass fired at 1400° C., wherein the basic batch for the tundish mass is made via previously known methods.

FIG. 4 shows a tundish mass fired at 1400° C. compounded in accordance with the teachings herein and including a proportion of raw magnesite of 20% by weight.

DETAILED DESCRIPTION

According to one preferred embodiment, the magnesite-based raw material is in the form of raw magnesite, especially as well only in the form of raw magnesite.

If the raw materials based on magnesite are present only in the form of raw magnesite, raw magnesite is present with a high purity and especially with the low contents of calcium carbonate, as indicated above.

The proportion of magnesite-based raw materials in the batch may be at least 5% by weight, including, for example, at least 6%, 8%, 10%, 12%, 14%, 16% or 18% by weight. As an example, the proportion of magnesite-based raw materials in the batch may be at most 45% by weight including, for example, at most 43%, 42%, 40%, 38%, 36%, 34%, 32%, 30%, 28%, 26%, 24%, 22% or 21% by weight.

Unless otherwise indicated, the proportions stated herein are given as percentages by weight, respectively relative to the total weight of the batch of the invention or of the fired product of the invention.

Preferably, the magnesite-based raw materials have a small grain size, in particular a grain size of <3 mm, <2 mm or <1 mm. As an example, the magnesite-based raw materials may have at least 50% by weight with a grain size of <1 mm, <0.5 mm or even <0.1 mm in the batch (respectively relative to the total mass of the magnesite-based raw materials). It is also possible for the magnesite-based raw materials to have a grain size, $d_{90}$ (i.e. a grain size whereby at least 90% by weight of the appropriate components relative to the total weight of the appropriate components is below the given grain size), of <1 mm, <0.5 mm or <0.1 mm.

The magnesia-based raw material may, for example, be in the form of at least one of the following raw materials: sintered magnesia or olivine $((Mg, Fe)_2SiO_4)$.

Along with the magnesite-based raw materials, the magnesia-based raw materials may also have a relatively small grain size, for example a grain size of <3 mm, <2 mm or <1 mm. As an example, the magnesia-based raw materials may have a grain size, $d_{90}$, of <1 mm. In particular, when the batch is to be used as a tundish mass, the magnesia-based raw materials may have a grain size $d_{90}$ of <1 mm, <0.5 mm or <0.3 mm.

The magnesia-based raw materials are present in a proportion of at least 55% by weight in the batch, including, for example, in a proportion of at least 56%, 58%, 60%, 62%, 64%, 66%, 68%, 70%, 72%, 74%, 76%, 78% or 79% by weight. As an example, the magnesia-based raw materials may be present in a proportion of at most 95% by weight in the batch, including, for example, in a proportion of at most 92%, 90%, 88%, 86%, 84%, 82% or 81% by weight.

As indicated above, in accordance with the invention, it has been shown that higher proportions of calcium carbonate in the magnesite-based raw materials may have a negative effect on the properties of a product produced from the batch. In this regard, it may be ensured that the calcium oxide content in the magnesia-based raw materials is also relatively low. As an example, the total calcium oxide content in the magnesia-based raw materials may be less than 5% by weight, including, for example, less than 4%, 3%, 2% or 1% by weight, respectively relative to the total weight of the magnesia-based raw materials in the batch.

Having regard to the total batch, the CaO content in the batch may be less than 5% by weight, including, for example, less than 4% by weight, 3% by weight, 2% by weight, 1.8% by weight, 1.6% by weight, 1.4% by weight, 1.2% by weight, 1% by weight, 0.8% by weight, 0.6% by weight, 0.4% by weight, 0.2% by weight or 0.1% by weight.

In order to keep the proportions of calcium carbonate or CaO in the batch in accordance with the invention as low as possible, the batch of the invention may have no or only small proportions of limestone and dolomite. As an example, the total weight of these raw materials in the batch may be less than 5% by weight including, for example, less than 4%, 3%, 2% or 1% by weight.

The batch of the invention may comprise one or more plasticizers as further components, for example at least one of the following plasticizers: clay or bentonite. The batch may comprise plasticizers in proportions of at least 0.5% by weight, including, for example, in proportions of at least 1% by weight or 1.3% by weight. As an example, the batch may comprise proportions of plasticizers of at most 4% by weight including, for example, at most 3% by weight, 2% by weight or 1.7% by weight.

The batch may, for example, comprise sintering aids as a further component, for example boric acid. Sintering aids may be contained in the batch in proportions of at least 0.2% by weight, for example, including, for example, in proportions of at least 0.3% or 0.4% by weight. As an example, the batch may comprise sintering aids in proportions of at most 1.5% by weight including, for example, in proportions of at most 1.3% by weight, 1% by weight, or 0.7% by weight.

The batch may comprise at least one binder as a further component, for example at least one of the following binders: water glass or sodium hexametaphosphate. As an example, the batch may comprise binders in proportions of at least 0.5% by weight including, for example, in proportions of at least 1% by weight, 1.3% by weight or 1.5% by weight. As an example, the batch may comprise proportions of binders of at most 5% by weight including, for example, at most 4% or 3.5% by weight.

The batch may comprise paper or cellulose fibres as further components, in particular as pore-forming agents and adhesion promoters. As an example, the paper and/or cellulose fibres may be included in the batch in proportions of at least 0.2% by weight including, for example, in proportions of at least 0.3% by weight, 0.4% by weight, 0.5% by weight, 0.7% or 0.9% by weight. As an example, the batch may comprise proportions of paper and/or cellulose fibres in proportions of at most 2.0% by weight including, for example, in proportions of at most 1.5% or 1.2% by weight.

In accordance with the invention, in addition to magnesia-based and magnesite-based raw materials, in particular in the form of sintered magnesia, olivine and raw magnesite, it can be provided that the batch of the invention may comprise further components only in proportions of, for example, less than 10% by weight including, for example, in proportions of less than 9%, 8%, 7%, 6% or 5% by weight. In a continuation of this inventive concept, in addition to raw materials in the form of sintered magnesia, olivine and raw magnesite as well as the further components water glass, sodium hexametaphosphate, clay and bentonite, the batch of the invention may also contain less than 5% by weight of further components including, for example, proportions of less than 4% or 3% by weight.

In accordance with the invention, the batch may comprise an organic binder, in particular a temporary binder if the batch is to be used as a tundish mass in the form of a tundish dry setting mass. As an example, the batch may comprise at least one of the following organic binders: phenolic resin, glucose or citric acid. As an example, the batch may comprise organic binders in proportions of at least 1% by weight including, for example, in proportions of at least 2% or 2.5% by weight. As an example, the batch may comprise proportions of organic binders of at most 5% by weight including, for example, at most 4% or 3.5% by weight.

Furthermore, in accordance with the invention, it has been shown that high proportions of iron oxide ($Fe_2O_3$) and alumina ($Al_2O_3$) in the batch may have a negative influence on the properties of a product produced from the batch. In this regard, the proportions of $Fe_2O_3$ in the batch may be set at less than 3.5% by weight including, for example, less than 3% by weight, 2.5% by weight, 2% by weight, 1.5% by weight or 1.0% by weight. As an example, the proportions of $Al_2O_3$ in the batch may be less than 5% by weight including, for example, less than 4% by weight, 3% by weight, 2.5% by weight, 2% by weight, 1.5% by weight or less than 1.0% by weight.

The information given above regarding the $Fe_2O_3$ and $Al_2O_3$ contents in the batch as well as the information given above regarding the CaO content in the batch also applies to these oxide contents in the product of the invention.

The batch may additionally comprise water as a further component. To this end, the batch of the invention may be mixed with proportions of water which are known in the art in order to provide it with a consistency which is suitable for the respective use. In order to use the batch as a gunning mass, as an example, as is known in the art, water may be sprayed into the batch immediately prior to application. If the batch is to be used as a tundish mass in the form of a tundish wet gunning mass, for example, then, for example, prior to spraying onto the tundish lining, the batch may be mixed with water. In the case in which the batch is to be used as a tundish dry setting mass, for example, then, for example, the batch can be compounded without or with only a small quantity of water (for example less than 3% by weight) and, for example, comprise only organic temporary binders as indicated above.

The invention further concerns a method for producing a fired refractory ceramic product which comprises the following steps:
providing a batch in accordance with the invention;
applying the batch to the desired place of use;
firing the applied batch to form a fired refractory ceramic product.

Prior to or during application of the batch to the desired place of use, as described above, the batch may, if appropriate, be compounded with water.

As an example, the batch compounded with water may also be mixed, for example in the case in which the batch is to be used as a tundish mass in the form of a tundish wet gunning mass.

The batch—compounded with water if appropriate—can then be used in accordance with its intended purpose, for example as a gunning, tundish, ramming or backfill mass. To this end, the batch is applied to the desired place of use, i.e., for example, onto a region of the furnace to be repaired, if the batch is to be used as a gunning mass, or onto a tundish lining, if the batch is to be used as a tundish mass.

The invention further concerns the use of the batch of the invention as a gunning, tundish, ramming or backfill mass.

If the batch of the invention is to be used as a gunning mass, the gunning mass may in particular be used for the following plant: electric arc furnace, converter, steel casting ladle, pig iron ladle, RH plant or non-ferrous metals industry plant.

In the case in which the batch of the invention is to be used as a tundish mass, then particular the tundish mass can be used as an abrasion lining mass in the cast steel distributor (tundish).

As is known the art, firing of the applied batch to form a fired refractory ceramic product, i.e. a sintered refractory mass, may be carried out before or even during application of the mass.

As an example, ceramic firing of the mass may be carried out when it is used as a gunning mass or tundish dry setting mass even during application of the mass. As is known in the art, a batch which is used as a tundish mass in the form of a tundish wet gunning mass may, for example prior to using it, be initially dried, preferably below 600° C., and then fired at approximately 1000° C., before the tundish provided with the mass is used.

Firing the batch produces a fired refractory ceramic product, i.e. a refractory sintered product.

The invention also concerns a fired refractory ceramic product of this type which is produced by means of a method in accordance with the invention.

When the batch is used as a tundish mass, the tundish mass formed from this refractory sintered lining of the tundish which is obtained after firing constitutes such a fired refractory ceramic product. When the batch is used as a gunning mass, the gunning mass formed from this refractory sintered lining of the furnace which is obtained after firing constitutes such a fired refractory ceramic product.

Firing the batch to form a fired refractory ceramic product may be carried out at the temperatures which are regularly employed during the use of the product, i.e., for example, at temperatures in the range 1350° C. to 1700° C., i.e., for example, at approximately 1400° C., when a tundish mass has been produced from the batch. When a gunning mass has been produced from the batch, this may, for example, be fired at temperatures in the range 1550° C. to 1700° C., for example at temperatures from approximately 1600° C.

The structure of a fired product in accordance with the invention is characterized by characteristic phases. Thus, because of the low calcium carbonate content of the magnesite-based raw materials, the fraction of calcium-rich phases is relatively low. Thus, masses which are produced from normal, calcium carbonate-rich batches, for example, regularly have proportions of merwinite ($Ca_3Mg(SiO_4)_2$) of more than 0.5% by weight, and sometimes more than 10% by weight. However, a product in accordance with the invention regularly comprises proportions of merwinite <0.5% by weight, regularly also <0.1% by weight.

Furthermore, in contrast to prior art products of the same type, which again are produced on the basis of calcium carbonate-rich raw materials, a fired product of the invention is characterized by a high proportion of forsterite ($Mg_2(SiO_2)$). As an example, the proportion of forsterite in the product of die invention may be >5% by weight including, for example, >8% by weight. Products of this type from the prior art regularly have no or only very small proportions of forsterite.

The proportion of silica in the phases described above of the fired product of the invention originate, for example, from natural impurities in the raw olivine material or raw magnesite used or indeed from other components of the batch, in particular binders in the form of water glass or plasticizers in the form of clay or bentonite.

A fired product of the invention is characterized by excellent physical properties compared with the physical properties of those products which are produced on the basis of a batch which is not in accordance with the invention.

Thus, the fired products comprise a highly refractory binder matrix. When the batch is used as a gunning mass and is fired at temperatures in the range from approximately 1550° C. to 1700° C., the product obtained has a dense matrix. If the batch is used as a tundish mass and is fired at temperatures in the range from approximately 1400° C., the product obtained exhibits a high porosity.

Table 1 below shows two exemplary embodiments for batches in accordance of the invention, designated V2 and V4. The batches designated as V1 and V3 are comparative examples batches which are compounded in accordance with the prior art. Batches V1 and V2 are respectively batches which are used as gunning masses. Batches V3 and V4 are respectively used as tundish dry setting masses.

TABLE 1

| Raw material | V1 | V2 | V3 | V4 |
|---|---|---|---|---|
| Sintered magnesia 1-3 mm | 25 | 17 | | |
| Sintered magnesia >0.2-1 mm | 42 | 34 | 36 | 21 |
| Sintered magnesia flour >0-0.2 mm | 25 | 25 | 30 | 25 |
| Olivine >0-0.5 mm | | | 30 | 30 |
| Raw magnesite >1-3 mm | | 10 | | |
| Raw magnesite >0-1 mm | | 10 | | 20 |
| Water glass | | | 2 | 2 |
| Sodium phosphate | 5 | 2.5 | | |
| Clay | 3 | 1.5 | 1 | 1 |
| Cellulose fibres | | | 1 | 1 |

The purity of the sintered magnesia was high, at approximately 95% by weight of MgO relative to the sintered magnesia. The raw magnesite used had a proportion of approximately 1.5% by weight of calcium carbonate, relative to the raw magnesite.

The gunning masses V1 and V2 were used to repair furnaces and underwent a ceramic firing at the service temperatures of 1600° C. so that a fired refractory ceramic product was obtained from these masses. The batches V3 and V4 were used to produce a respective tundish. To this end, the masses V3 and V4 were mixed with water and then sprayed onto the tundish lining, then dried at approximately 500° C. and finally heated to approximately 1000° C. The final ceramic firing was then carried out when the tundish was used, at approximately 1400° C.

Table 2 summarizes the physical properties of fired refractory ceramic products produced from batches V1 to V4, wherein the product produced from batch V1 is designated E1, the product produced from batch V2 is designated E2, the product produced from batch V3 is designated E3 and the product produced from batch V4 is designated E4.

TABLE 2

| Property | E1 | E2 | E3 | E4 |
|---|---|---|---|---|
| Cold compression strength [N/mm$^2$] | 83.0 | 101.0 | 6.3 | 5.0 |
| Bulk density [g/cm$^3$] | 2.8 | 2.9 | 1.8 | 1.6 |
| Porosity [% by volume] | 18.5 | 16.5 | 44.5 | 54.3 |

The cold compression strength, bulk density and porosity were determined in accordance with DIN EN ISO 1927-6: 2012.

The accompanying figures are views of microsections of fired refractory ceramic products.

FIGS. 1 and 2 show gunning masses fired at 1600° C., wherein the basic batch for the gunning mass of FIG. 1 was compounded without magnesite-based raw material and the basic batch for the gunning mass of FIG. 2 was mixed in accordance with the invention and had a proportion of 20% by weight of raw magnesite. Reference numeral 1 indicates magnesia and reference numeral 2 shows the pores in the structure.

It can readily be seen that the fired product of FIG. 2 has a denser and more regular structure than the product of FIG. 1.

FIGS. 3 and 4 show tundish masses fired at 1400° C. The basic batch for the tundish mass of FIG. 3 is in accordance with the prior art, while the basic batch for the tundish mass of FIG. 4 was compounded in accordance with the invention and comprised a proportion of raw magnesite of 20% by weight. Again, reference numeral 1 indicates magnesia and reference numeral 2 indicates pores; furthermore, olivine which can be observed in the structure is indicated with reference numeral 3.

Here, the much more porous structure of the product of FIG. 4 compared with the product of FIG. 3 can be seen.

The invention claimed is:

1. A batch for producing an unformed refractory ceramic product comprising:
  1.1 55 to 83.5% by mass of at least one magnesia-based raw material in the form of at least one of the following raw materials: sintered magnesia or olivine, and
  1.2 16 to 44.5% by mass of raw magnesite comprising primarily magnesium carbonate, each relative to the total mass of the batch; wherein
  1.3 a total calcium carbonate content of the raw magnesite lies below 10% by mass relative to the total mass of the raw magnesite; and
  1.4 0.5 to 4% by mass of clay.

2. The batch according to claim 1, wherein at least one of the following oxides exhibits the maximum fraction indicated in each case:
  CaO<5% by mass;
  $Fe_2O_3$<3.5% by mass;
  $Al_2O_3$<3.0% by mass;
  relative to the total mass of the batch in each case.

3. A method for producing a fired refractory ceramic product comprising the following steps:
  5.1 provision of a batch comprising:
    55 to 83.5% by mass of at least one magnesia-based raw material in the form of at least one of the following raw materials: sintered magnesia or olivine, and 16 to 44.5% by mass of raw magnesite comprising primarily magnesium carbonate, each relative to the total mass of the batch; wherein a total calcium carbonate content of the raw magnesite lies below 10% by mass relative to the total mass of the raw magnesite, and wherein in addition to the at least one magnesia-based raw material, and said raw magnesite, 0.5 to 4% by mass of clay;

5.2 application of the batch to a desired production site;

5.3 firing of the applied batch into a fired refractory ceramic product.

4. The method according to claim 3 for producing said fired refractory ceramic product which exhibits at least one of the following phases in the fractions indicated in each case:

forsterite: >5% by mass;

merwinite: <0.5% by mass;

relative to the total mass of the product in each case.

5. The method according to claim 3 for producing said fired refractory ceramic product wherein at least one of the following oxides exhibits at most the fraction indicated in each case:

CaO<5% by mass;

$Fe_2O_3$<3.5% by mass;

$Al_2O_3$<3.0% by mass;

relative to the total mass of the product in each case.

6. The method according to claim 3, wherein the batch is applied to the desired application site as an injection mass, tundish mass, ramming mass or backfilling mass.

7. The method according to claim 4 for producing said fired refractory ceramic product, wherein at least one of the following oxides exhibits at most the fraction indicated in each case:

CaO<5% by mass;

$Fe_2O_3$<3.5% by mass;

$Al_2O_3$<3.0% by mass;

relative to the total mass of the product in each case.

* * * * *